SPINDLE PLACEMENT

Filed Aug. 6, 1956 2 Sheets-Sheet 1

INVENTOR.
Robert W. Goode
BY
Hansen and Lane
ATTORNEYS

June 7, 1960 R. W. GOODE 2,939,647

SPINDLE PLACEMENT

Filed Aug. 6, 1956 2 Sheets-Sheet 2

INVENTOR.
Robert W. Goode

BY
Hansen and Lane

ATTORNEYS 2,939,647
Patented June 7, 1960

2,939,647

SPINDLE PLACEMENT

Robert W. Goode, Morgan Hill, Calif., assignor to Gerald A. M. Petersen, Santa Clara, Calif.

Filed Aug. 6, 1956, Ser. No. 602,387

7 Claims. (Cl. 242—85)

This invention relates to wire stringing apparatus and more especially to a spindle support for reels in such apparatus facilitating spindle placement therein.

In the art of wire stringing apparatus it is customary to employ a reel support adjacent a tensioning mechanism such as described in copending U.S. application, Serial No. 479,041 of Gerald A. M. Petersen, filed December 31, 1954. In wire stringing apparatus of this type the tensioning mechanism consists of a pair of bull wheels arranged in parallel relation one above the other on a supporting tower to receive a strand of cable or high tension wire from the reel. The cable is payed out from the reel and wound about the bull wheels several times to assure sufficient frictional or surface contact of the wire against the same so as to maintain a high degree of tension on the wire. These bull wheels have manually controlled brake mechanism operatively associated therewith so as to retard normal free turning of the bull wheels during paying out of the wire up onto the cross arms of power poles or towers.

The wire payed out over the bull wheel arrangement comes from a heavy drum or reel which must be suitably supported adjacent the bull wheels to feed the wire toward the same. One of the most common forms of reel support is a spindle shaft inserted through the center core of the reel upon which the cable or wire is wound. The ends of this spindle shaft are journaled in suitable bearings or trunnions formed as a part of the frame of the cable stringing apparatus. Since the cable or wire is pulled from the reel over and around the bull wheels by winches or tractors several pole lengths away there must be means for retarding free turning of the reel relative to its spindle support to prevent override and resulting kinking, entanglement and more seriously, marring or scratching of the cable.

The present invention is concerned with a spindle placement unit contemplating a simple structure which is economical to manufacture but more particularly one which facilitates mounting and demounting of cable reels relative to a supporting trunnion with a minimum of effort or loss of time.

Another object is to provide means for coupling a reel to a brake disc simultaneous with placement of the same in journaled relation with supporting bearings on a frame.

It is another object to provide a spindle shaft with hook receiving eyes so disposed as to facilitate lifting of the reel by a crane or the like for placement in bearings supported on trunnion arms. In this connection it is a further object to provide a coupling unit on one of said bearing supports with a pocket for receiving a supporting disc or flange on one end of the spindle shaft. In addition thereto I provide means for drawing the supporting disc into supported relation throughout 360° of the receiving pocket of the coupling unit.

These and other objects of the present invention will become more apparent in the following description and drawings in which.

Figures 1, 2, 3:
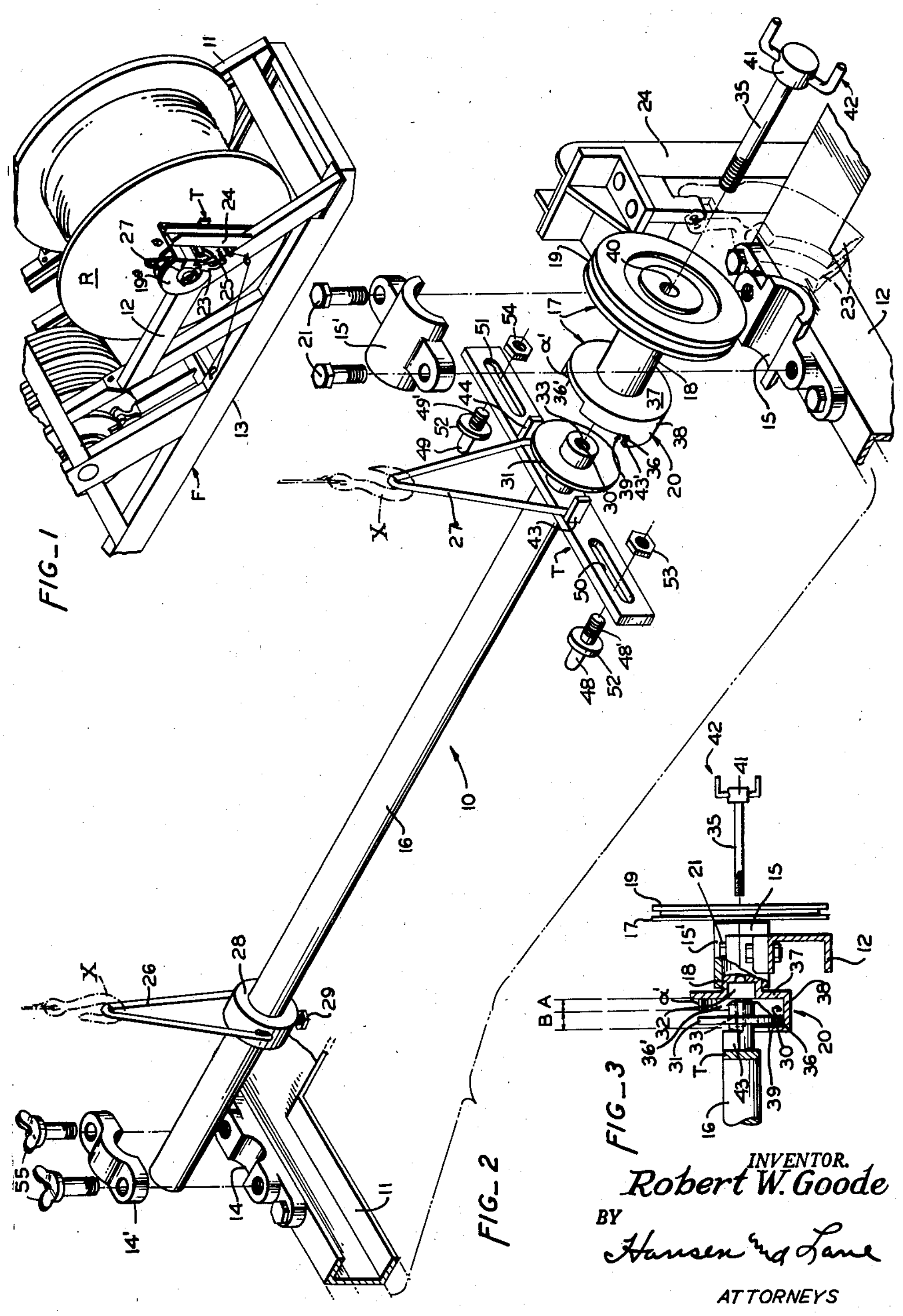
Fig. 1 is a fragmentary perspective view of a reel support embodying the spindle placement features of the present invention.
Fig. 2 is an exploded perspective view of the spindle placement unit only of Fig. 1 and at relatively larger scale.
Fig. 3 is an axial section through a coupling saddle forming a part of the brake side of the unit shown in Figs. 1 and 2.
Figure 4:
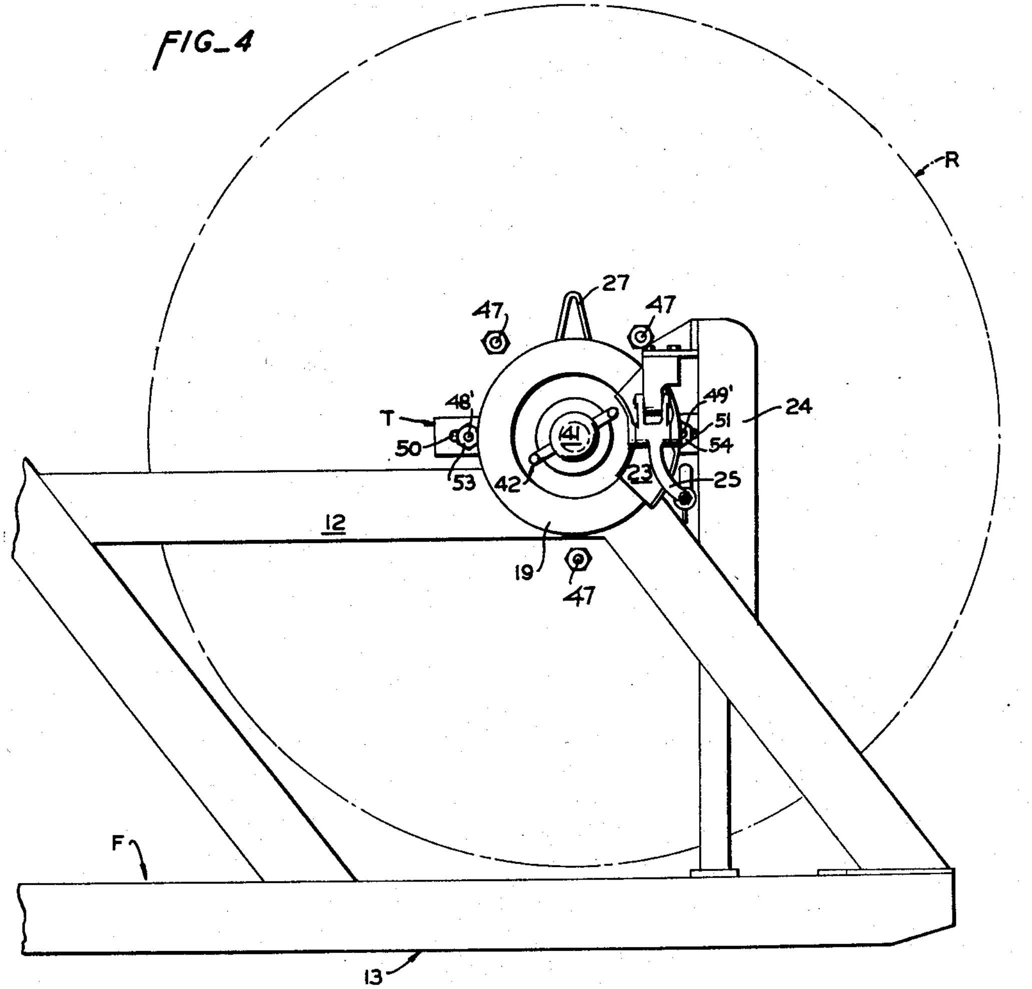
Fig. 4 is a side elevational view of the brake side of Fig. 1.

As seen in Figs. 1 and 4 of the drawings the spindle placement unit 10 of the present invention is used in connection with a frame F having a pair of upstanding sides 11 and 12 between which a reel R can be placed. These sides 11 and 12 in the present disclosure are channel shaped structural members welded to the main bed 13 of the frame F. The bed members 13 are adapted to skid onto a flat bed truck or trailer or to be temporarily set upon blocks providing a firm and fixed foundation for the supporting frame.

The sides 11 and 12 are spaced from each other to receive the reel R between them. Each side has the base of a suitable bearing boss 14 and 15 secured thereto. These bearing bosses 14 and 15 are axially aligned for supporting a spindle shaft 16 upon which the reel R is mounted.

The spindle shaft 16 of the present invention includes a brake and coupling unit 17 consisting of a hollow hub portion 18. This hub 18 is preferably of a size comparable to the diameter of the spindle shaft 16 and adapted to be supported in the bearing boss 15. One end of the hub 18 has a brake disk 19 secured thereto or formed integrally therewith and coaxially thereof. The other end of the hub 18 has secured thereto a hollow cylindrical body which is cut away diametrically adjacent its open end to provide a saddle 20 coaxially of the hub 18. The arrangement is such that the hub portion 18 is substantially the same length as the boss base 15 so that the brake disk 19 lies just outside the same while the saddle 20 lies just inside the boss base 15.

Figure 5:
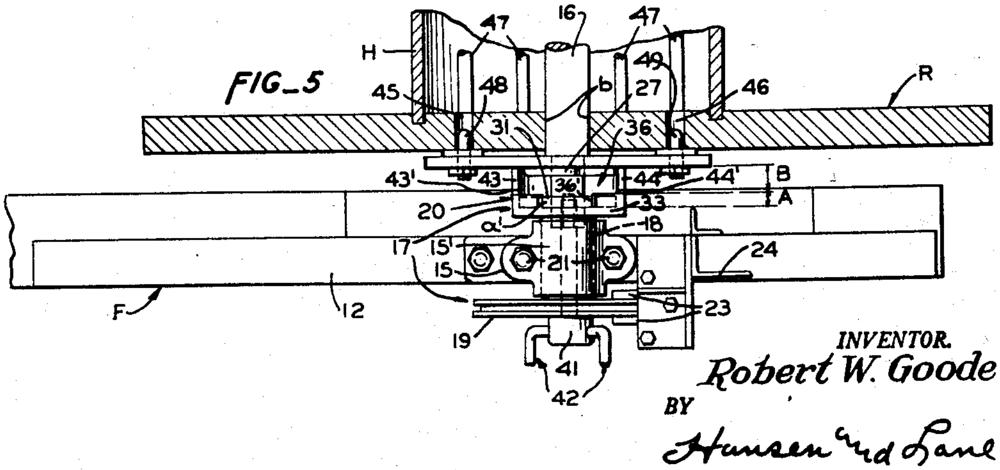
Fig. 5 is a plan view of Fig. 4 showing the brake side only of the reel support with all parts assembled and ready for use.

As clearly illustrated in Figs. 3 and 5, the brake and coupling unit 17 is secured upon the bearing boss base 15 beneath a half bearing cap 15' by means of stud bolts 21. The brake and coupling unit 17 is thus more or less permanently assembled upon the side wall 12 of the frame adjacent a pair of brake shoes 23 suitably supported on an upstanding bracket 24 having its lower end welded or otherwise secured to the side 12 of the frame. The brake shoes 23 straddle the rear segment of the brake disc 19 and are normally urged away from the same but adapted to be manipulated into frictional engagement with the disc when a control lever 25 is manually operated. For purposes of this disclosure I have shown a brake similar to that described in U.S. Letters Patent No. 1,978,974, dated October 30, 1934. The present invention contemplates a spindle placement structure embodying the brake and coupling unit 17 as well as features and construction now to be explained.

The spindle shaft 16 has a pair of hook receiving eyes 26 and 27 associated therewith. One of these hook receiving eyes 26 is formed integrally with a removable collar 28 which slip fits over the free end of the shaft 16. This removable collar 28 has a set screw 29 by which the collar is adapted to be firmly secured to the shaft 16 at any desired position along its length.

The other hook receiving eye 27 is permanently secured to or formed as a part of the shaft 16 by having its ends welded to a cross-head T in turn welded to the shaft 16 adjacent one end 30 thereof. Also welded in predetermined spaced relation to the end 30 of the shaft 16 a slight distance from the cross-head T is a supporting disc 31. This disc 31 is adapted to be lowered radially into the saddle 20 for support thereby. The extreme end 30 of the shaft 16 extends slightly beyond the supporting disc 31 and is adapted to fit and to be drawn into a bored seat 32 formed in the saddle 20 coaxailly of its hub portion 18 thereof (Fig. 3). The end 30 of shaft 16 has an axial bore 33 which is threaded to receive the threaded end of a securing screw 35 in a manner later to be explained.

The supporting disc 31 as previously stated is in spaced relation to the end 30 of shaft 16 and to the cross-head T mentioned above. Stated in another way the disc 31 is approximately midway between the T-head and the extreme end 30 of the shaft 16 so as to fit and to be lowered into the half circle pocket 36 provided in the saddle type coupling unit 20.

As seen in Figs. 2, 3 and 5 the coupling unit 17 has a disc like back wall 37 closest to the end 30 of the shaft 16. From the disc-like back 37 a cylindrical body 38 extends inwardly of the frame F, i.e., toward the boss base 14 on the opposite side 11 of the frame. It is in this hollow center of the cylinder-like body 38 that the aforementioned pocket 36 is provided.

Although the saddle 20 is adapted to turn or rotate about the axis of the hub 18 which is journaled within the bearing provided by the base and cover 15 and 15', the pocket 36 is disposed open side up when the supporting disc 31 is to be lowered into the saddle. Consequently for purposes of clarity the cutaway features of the cylinder-like body 38 will be considered so disposed and as illustrated in the drawings.

The cylinder-like body 38 of the saddle 20 is cut away at two different strata along the length of its axis. At stratum A adjacent the disc-like back 37 a segment *a'* of the cylindrical body 38 is cut away a chordal distance sufficient to admit the extreme stub end 30 of the shaft 16 into the pocket 36. At stratum B the body 38 is cut away substantially diametrically across so as to admit the supporting disc 31 radially into half circle pocket 36. Beyond this stratum B the body 38 is provided with an inturned flange 39 for retaining the supporting disc 31 within the pocket 36 with the threaded bore 33 at the extreme end 30 of the shaft 16 so disposed, i.e., axially of the hub, as to receive the securing screw 35 when it is extended through the hollow hub portion 18 of the coupling unit 20.

As seen in Fig. 2 the screw 35 is inserted into the outside open end 40 of the hollow hub portion 18. The screw 35 has an enlarged head 41 adapted to bear against the material surrounding the opening 40. The securing screw 35 is of a length such as to span the hub section 18 and to fit the threaded bore 33 in the extreme end 30 of the shaft 16. The head 41 of screw 35 has lever handles 42 for turning the securing screw 35 to thread the opposite end of the latter into the bore 33. Thus the head end 41 of the screw bears against the end of the hub portion and draws the spindle shaft 16 axially along until the supporting disc 31 thereon is drawn firmly up against the disc-like back 37 of the coupling unit. In this position the supporting disc is lodged within stratum A or that portion 36' of the cylindrical body 38 which completely circumscribes the disc 31 except for the small chordal cut away *a'* thereof. In this manner the disc 31 is confined within a supporting socket 36' for circumferential support thereby so as not to fall out of the pocket 36 when the coupling unit 20 turns relative to the bearing 15—15'. Thus shear stress on the securing screw is eliminated.

In addition to confinement of the disc 31 to coaxial alignment with the hub 18 a driving connection or coupling is also established between the coupling unit 17 and the cross-head T on the shaft 16. To this end the T head has a pair of lugs 43 and 44 extending therefrom a distance comparable to the stratum B in which the half circle pocket 36 is provided. These lugs 43 and 44 are spaced from each other a distance corresponding to the diameter of the cylindrical body 38 and they are equidistant from the axis of the shaft 16 so as to register with the side walls of the half circle pocket 36.

In addition to the foregoing the lugs 43 and 44 have their bottom edges aligned diametrically opposite each other so as to slide directly onto the exposed upper edges 43' and 44' on the side walls of the pocket 36. Now when the securing screw 35 draws the supporting disc 31 into the supporting socket 36' the lugs 43 and 44 are simultaneously drawn into surface contact with the diametrically opposite upper edges 43' and 44', respectively, so that turning movement of the shaft 16 is transmitted to the coupling unit 17. When the brake shoes 23 are caused to grip the brake disc 19 the retarding effect against turning of the coupling unit 17 likewise retards turning of the spindle shaft 16 and anything supported thereon.

As previously stated, one hook receiving eye 26 is removable relative to the shaft 16 by reason of its being carried by a collar 28 provided with set screw 29. When this collar 28 is removed from the spindle shaft 16 the shaft is simply inserted into a conventional bore *b* formed axially through the hub H of a reel R upon which the high tension wire is coiled. The sides of these reels usually have diametrically opposed holes 45 and 46. In some cases tie rods 47 extend through these holes 45—46. When the tie rods are removed from diametrically opposite holes key plugs 48 and 49 can be inserted into them adjacent the cross-head T on shaft 16. In some cases diametrically opposed holes are provided to receive hooks, cables or the like for purposes of anchoring the reels to truck beds or the flat beds of a railroad car. If no such holes are available it is a simple matter to bore them into the side walls of the reels. In any event these holes are available for the key plugs 48 and 49 extending from the cross head T in a manner now to be explained.

The cross-head T is provided with a slot 50 and 51 on each extension thereof radially outward from the shaft 16. The key plugs 48 and 49 each have a flange 52 midway their ends adapted to lie against the side wall of the cross-head T while the threaded ends 48' and 49' of the key plugs 48 and 49 respectively extend through the respective slots 50 and 51 in the cross-head. A nut 53 and 54, on the threaded end 48' and 49' of the respective key plugs 48 and 49, when tightened up secures these plugs to the cross-head T. Consequently after the spindle shaft 16 is inserted through the center bore *b* in the reel the key plugs 48 and 49 are ready to fit into the diametrically opposed holes 45 and 46 in the side wall of the reel. The slots 50 and 51 in the cross-head facilitate positioning of the key plugs to register with the holes 45 and 46 whatever radial distance they may be from the axis of shaft 16. In this manner the reel R is suitably connected to the shaft 16 for turning therewith.

Now when the removable collar 28 is again placed upon the opposite end of the shaft 16 it becomes a securing means by which the reel R is maintained against the cross-head T at the other end of the shaft. The set screw 29 is secured down to fix the collar 28 firmly against the side wall of the reel. The hook receiving eyes 26 and 27 are set relative to the shaft 16 so as to extend in the same radial direction therefrom whereby hooks X—X can be engaged in these eyes and the shaft with reel thereon suspended therefrom.

With the spindle shaft 16 thus assembled on a reel R the two eyes 26 and 27 are accessible to hooks X on cables from a crane or lifting device. Thus the reel R can be lifted by the spindle arrangement and can be lowered between the side walls 11 and 12 of the frame F. Thus the supporting disc 31 is easily placed into the open sided pocket 36 or saddle formed in the coupling unit 17 while the opposite end of the shaft 16 is easily lowered into place on its base boss 14.

The securing screw 35 is then inserted into the open end 40 of the hub 18 and turned to engage its threaded end with the bore 33 in the shaft 16. Thus the entire shaft 16 with reel thereon is drawn toward the coupling unit 17 while the supporting disc 31 becomes confined within the socket 36' thereof. The hooks X can now be removed from the eyes 26 and 27 and the spindle shaft with reel thereon is free to turn relative to the bearings 14 and 15. To play safe, however, the cap 14' should be placed over the bearing boss 14 and thumb bolts 55 employed to secure the cap 14' to its base. It will be recalled that the coupling unit 17 is at all times secured between its cap 15' and bearing boss 15 which need not be dismantled in order to remove or replace the spindle placement arrangement just explained.

Moreover, the supporting disc 31 formed as a part of the shaft 16 is confined in a socket 36' while the extreme end 30 of the shaft is confined within the bore seat 32 formed in the hub portion 18 of the coupling unit. As a result of this simple axial placement of the disc and shaft relative to the coupling unit the reel R is well supported for turning movement relative to the frame F.

While I have explained my spindle placement structure in specific detail it will be appreciated by those skilled in the art that it may be modified, altered, and/or varied without departing from the spirit of my invention. I therefore desire to avail myself of all modifications, variations, and/or alterations as fairly come within the purview of the appended claims.

What I claim as new and desire to protect by Letters Patent is:

1. In combination with a spindle shaft extending through a cable bearing reel so as to extend trunnion fashion therefrom, for placement on a frame including a pair of side walls each having a shaft supporting bearing thereon; a coupling unit connected to brake means having a hub supported in one of said bearings including an open sided saddle adapted to receive a supporting disc in a direction radially of the axis of said bearing, a supporting disc formed on one end of said spindle shaft adapted to fit into the open side of said saddle for temporary support thereby, said saddle having a socket formed concentrically of said hub portion, and a securing screw extending through the hub of said saddle and into said spindle shaft for drawing said supporting disc into said socket.

2. In combination with a spindle shaft secured axially through a cable bearing reel so as to extend trunnion fashion therefrom, for placement on a frame including a pair of side walls each having a shaft supporting bearing; a coupling unit having a hub portion provided with a brake disc connected to a brake means, said hub portion being supported in the bearing on one side wall of said frame, said hub portion having a cylindrical body provided with a supporting disc receiving saddle, a supporting disc formed adjacent one end of said spindle shaft adapted to fit radially into the open side of said saddle and to leave a stub end of said shaft projecting toward said hub portion said hub portion having a bore formed therein to receive the stub end of said spindle shaft, the stub end of said shaft being bored and tapped, a securing screw extending through the hub portion of said saddle and into the tapped bore in said spindle shaft for drawing said supporting disc into said cylindrical body.

3. In a spindle placement unit facilitating mounting and demounting a cable bearing reel relative to aligned bearings on a pair of spaced side walls, a spindle shaft adapted to extend through said reel, a cross-head on said shaft including keyplugs adapted to extend into one side wall of said reel so that the latter is coupled with said spindle shaft for turning therewith, a collar secured to the other end of said shaft and bearing against the other side wall of said reel for maintaining the latter in coupled relation to said cross-head, a hook receiving eye on each said cross-head and collar and extending in the same radial direction from said shaft to facilitate lifting and lowering of said reel and spindle relative to said spaced side walls, a hub portion journaled in the bearing on one of said side walls connected to brake means on said one of said side walls, said hub portion having a cylindrical pocket formed on its other end cut away in one zone thereof to receive a supporting disc in a radial direction, a supporting disc formed on one end of said spindle shaft for reception radially into said cylindrical pocket, said spindle shaft having a tapped bore in said one end thereof, and screw means concentrically of said hub portion extending toward the tapped bore in said spindle shaft for drawing the latter toward said hub portion and said supporting disc into the uncut zone of said cylindrical pocket for circumferential support thereby.

4. A spindle placement unit for receiving and supporting a spindle on which a cable bearing reel is mounted comprising aligned bearings on a pair of side frames adapted to straddle a reel disposed between them, a coupling unit including a hub journaled in the bearing on one of said frames, a cylindrical pocket formed on one end of said hub having one side cut away diametrically to receive a supporting disc radially thereof, a supporting disc on one end of said spindle shaft adapted to fit into the cutaway side of said pocket, and means axially of said hub operatively engageable with said spindle shaft for drawing the same and said supporting disc into said cylindrical pocket.

5. In a spindle placement unit facilitating mounting and demounting a cable bearing reel relative to a pair of spaced bearing on trunnion side walls for influence by a brake means on one of said side walls; a spindle shaft adapted to extend through said reel, a cross-head on said shaft having key plugs engageable with said reel for turning the latter therewith, a coupling unit including a hub portion journaled in the bearing on said one of said side walls, a brake disc formed on one end of said hub portion for frictional engagement by said brake means, a cylinder on the other end of said hub portion cut away diametrically to radially receive a supporting disc and to provide diametrically opposed bearing surfaces, a supporting disc formed on one end of said spindle shaft for reception in said cylinder, said spindle shaft having a tapped bore in said one end thereof, a pair of lugs formed on said cross-head for registration and engagement with the diametrically opposed bearing surfaces on said cylinder, and screw means concentrically of said hub portion extending into the tapped bore in said spindle shaft for drawing said supporting disc into said cylinder and for registering and engaging said pair of lugs with said diametrically opposed bearing surfaces.

6. In combination with a spindle shaft extending through a cable bearing reel so as to extend trunnion fashion therefrom for placement on a frame having a pair of side walls each having a shaft supporting bearing thereon; a coupling unit having a hub portion connected to brake means journaled in the bearing on one of said side walls, a hollow cylindrical body formed on the inner end of said hub portion and having an open end facing inwardly of said frame, said cylindrical body being cut away diametrically adjacent the open end thereof to provide a disc receiving saddle in the hollow of said body, a supporting disc on one end of said spindle shaft adapted to fit radially into the saddle portion of said hollow body, and means for drawing said supporting disc into the hollow of said cylindrical body for circumferential support thereby.

7. In combination with a spindle shaft extending through a cable bearing reel so as to extend trunnion fashion therefrom for placement on a frame having a pair of side walls each having a shaft supporting bearing thereon; a coupling unit having a hub portion connected to brake means journaled in the bearing on one of said side walls, a hollow cylindrical body formed on the inner end of said hub portion and having an open end facing inwardly of said frame, said cylindrical body being cut away diametrically adjacent the open end thereof to provide a disc receiving saddle in the hollow of said body, a supporting disc on one end of said spindle shaft adapted to fit radially into the saddle portion of said hollow body, means for drawing said supporting disc into the hollow of said cylindrical body for circumferential support thereby, and means connecting said spindle shaft to said reel for retarding turning thereof relative to said bearings under the influence of the brake means connected to said hub portion.

References Cited in the file of this patent

UNITED STATES PATENTS

| | | |
|---|---|---|
| 520,475 | Barger | May 29, 1894 |
| 1,818,261 | Koch et al. | Oct. 14, 1927 |
| 1,875,153 | Richter | Dec. 6, 1927 |